Feb. 17, 1942.    H. G. SHAKESPEARE    2,273,334
VERNIER CONTROL
Filed Dec. 18, 1939
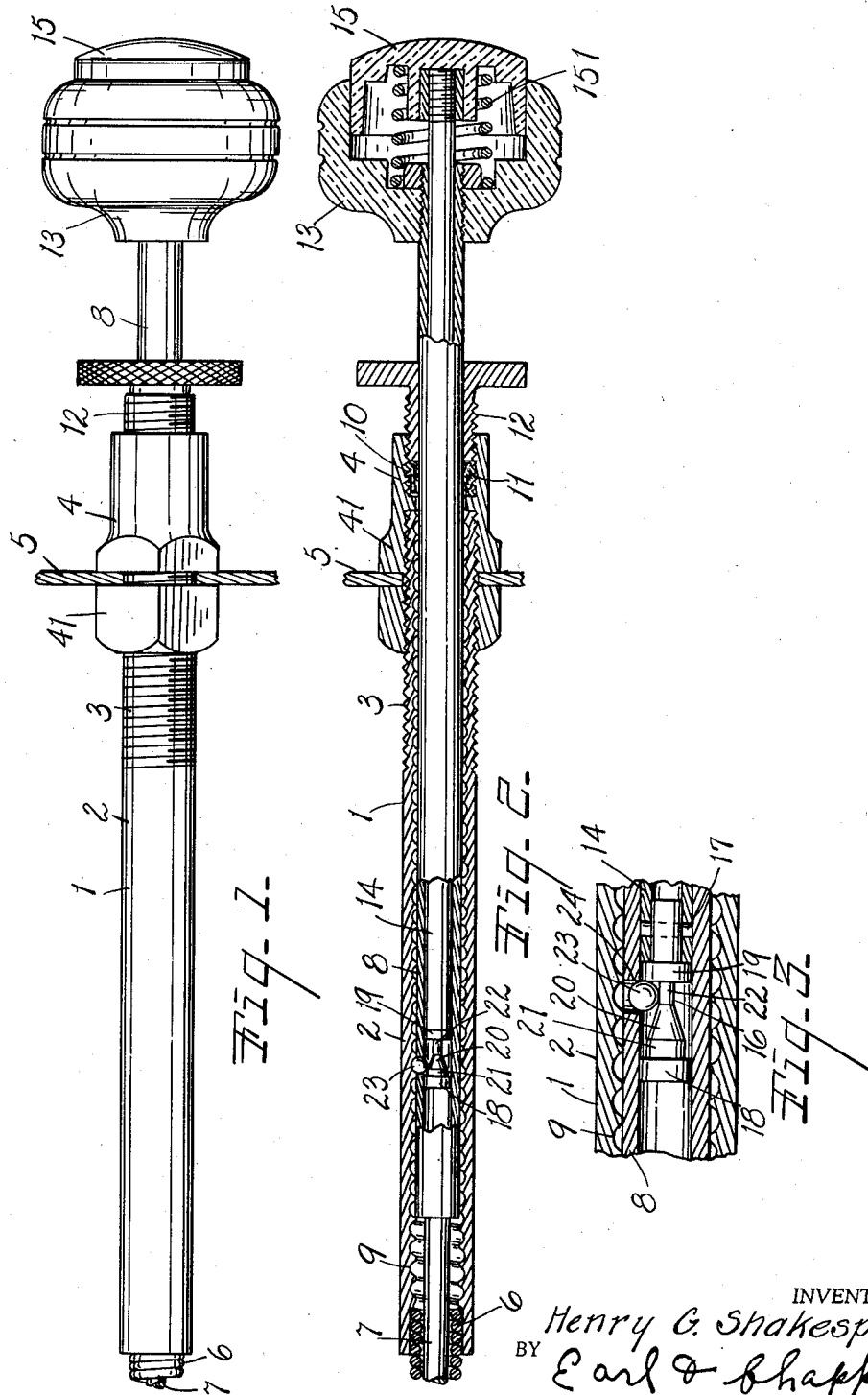
INVENTOR.
Henry G. Shakespeare
BY Earl & Chappell
ATTORNEYS Patented Feb. 17, 1942

2,273,334

UNITED STATES PATENT OFFICE 2,273,334

VERNIER CONTROL

Henry G. Shakespeare, Kalamazoo, Mich., assignor to Shakespeare Products Company, Kalamazoo, Mich., a corporation of Michigan Application December 18, 1939, Serial No. 309,773

8 Claims. (Cl. 74—503)

This invention relates to improvements in vernier controls.

The main objects of this invention are:

First, to provide a manually operable control device for certain mechanisms or parts of motor vehicles, airplanes, and other parts where remote control is desired which is capable of quick adjustment and also fine or accurate adjustment.

Second, to provide a control device having these advantages which is simple and compact in its parts and not subject to undue wear.

Third, to provide a control device which is capable of quick and fine or vernier adjustment which may be quickly released and adjusted to closed position merely by a thrusting movement.

Objects relating to details and economies of the invention will appear from the description to follow. The invention is defined and pointed out in the claims.

Preferred embodiments of the invention are illustrated in the accompanying drawing, in which:

Fig. 1 is a fragmentary view illustrating the control device in accordance with my invention in operative mounted position on a control panel or the like, such as the dashboard of an automobile or airplane.

Fig. 2 is a fragmentary view partially broken away and in longitudinal section illustrating details of the device.

Fig. 3 is an enlarged fragmentary view more clearly illustrating details of construction and the manner of coaction of the parts in use.

The present invention relates to a vernier control for an instrument panel or the like to furnish a control for any one of a number of different instrumentalities, for example a throttle, in which, in certain instances, it may be desirable to effect a coarse or rough adjustment and in other cases to effect a relatively fine and accurate manipulation. The present invention satisfies these requirements very well in a construction which is compact and economical in its parts and has no lost motion.

Referring to the drawing, the reference numeral 1 in general indicates the device of my invention which consists of an elongated tubular support 2 having threads 3 at one end for mounting the same in a fitting or mounting 4 and co-acting nut 41 by which the device is secured to the control panel 5 of an automobile or an airplane or for that matter any suitable support.

The support 2 receives a suitable flexible sheath element 6 for the connecting cable or rod 7. This is a cable of the type whereby end thrust or tension may be imparted to the part to be controlled, as for example the throttle of a motor.

The tubular adjusting member 8 is mounted within the member 2 for axial sliding and also for rotative adjustment. The support 2 is provided with a continuous internal thread 9 preferably in the form of a semi-circular helical groove.

The mounting member 4 is counterbored at 10 to receive a suitable friction packing-like material 11 which is compressed by the manually adjustable gland 12 threaded into the member 4 whereby friction is applied to the adjusting member 8 to prevent accidental or too easy movement of the control member either longitudinal or rotatable.

The member 8 is provided with a hand piece or knob 13 at its outer end, its inner end being attached to the transmission cable or member 7.

I slidably mount within the member 8 a control or release rod 14, this rod 14 being provided with a push button 15 at its outer end telescoping within an outwardly facing recess in the knob or finger piece 13 and urged yieldingly outward by means of the coiled spring 151.

At its inner end the control rod 14 is provided with a part designated generally by the numeral 16 (Fig. 3) which is secured thereto by means of the transverse pin 17. This part or member 16 is provided with a pair of spaced cylindrical members 18 and 19 slidably fitting within the adjusting member 8. Between these members 18 and 19 is a conical cam part 20 having a cylindrical portion 21 at one end and a reduced portion 22 at the other end.

The thread engaging member 23 is preferably in the form of a ball or sphere and this is adapted to engage the threads through the opening 24 in the side of the member 8, the cam 20 being normally urged outwardly by the spring 151 to engage this ball with the thread so that by grasping its knob or finger piece 13 the accurate or fine adjustment of the control is secured.

When it is desired to make quick adjustment, a thrust upon the push button 15 will release the member 8 so that it can be adjusted axially or slidably to any position throughout its stroke. In airplane practice, it is common to control the throttle manually and in operating position the adjusting member is pulled out to the desired point and adjusted by threaded or rotative movement to properly gauge the engine speeds or where more than one engine is employed to separate the engines. However, it is sometimes desirable to quickly open the throttle and this may be done merely by pushing on the push button 15 which releases the thread engaging member and continued thrust will open the throttle.

I preferably form the cylindrical element or land 21 of the cam member of such length that the thread engaging member rests fully thereon in actuated position so that there will be no tendency for the thread engaging member to cammingly urge the control rod to the releasing position.

The foregoing instruments are simple in their parts, compact, unlikely to become inoperative through wear and readily manipulated to effect the desired coarse or fine adjustments. They may be utilized in connection with any control relying upon axial movement, as will be apparent, and the fine adjustment made possible thereby has no lost motion, either endwise or angular.

I have illustrated and described my improvements in an embodiment which I have found very practical. I have not attempted to illustrate or describe other embodiments or adaptations as it is believed this disclosure will enable those skilled in the art to embody or adapt my improvements as may be desired.

Having thus described my invention, what I claim as new and desire to secure by Letters Patent, is:

1. A vernier control for a push and pull actuating element comprising a tubular support having an internal helical groove, a tubular adjusting member slidable axially of the longitudinal axis of and rotatable in said support said adjusting member being provided with a finger piece at its outer end, and means for adapting said adjusting member for threading movement in said support by engagement with said helical groove or for sliding movement in said support comprising a groove-engaging ball carried by said adjusting member for axial and rotative movement therewith, said adjusting member having a radial opening receiving said ball for radial inward and outward movement relative to the longitudinal axis of the adjusting member, a control rod slidable in said adjusting member and having a cone-shaped element cammingly engageable with said ball to project the latter radially outwardly in said opening in said adjusting member for operative engagement with said groove, spring means urging said rod to a position in said adjusting member wherein the ball is projected by said element, means for actuating said control rod in opposition to said spring means, said ball coacting with said groove in operative position for threading adjustment of the adjusting member in said support and in opposite retracted position permitting free axial slidable movement of the adjusting member in the support, and means for applying friction to said adjusting member.

2. A vernier control for a push and pull actuating element comprising a tubular support having an internal helical groove, a tubular adjusting member slidable axially of the longitudinal axis of and rotatable in said support, said adjusting member being provided with a finger piece at its outer end, and means for adapting said adjusting member for threading movement in said support by engagement with said helical groove or for sliding movement in said support comprising a groove-engaging element carried by said adjusting member for axial and rotative movement therewith, said adjusting member having a radial opening axially confining said element and receiving the same for radial inward and outward movement relative to the longitudinal axis of the adjusting member, a control rod slidable in said adjusting member and having an element cammingly engageable with said groove engaging element to project the latter radially outwardly in said opening in said adjusting member for operative engagement with said groove, spring means urging said rod to a position in said adjusting member wherein the groove engaging element is projected by said second mentioned element, means for actuating said control rod in opposition to said spring means, said groove engaging element coacting with said groove in operative position for threading adjustment of the adjusting member in said support and in opposite retracted position permitting free axial slidable movement of the adjusting member in the support, and means for applying friction to said adjusting member.

3. In a control device of the class described, the combination of an elongated tubular internally threaded support, an adjusting member slidably and rotatably associated with said support for axial sliding movement along the longitudinal axis of the support and rotation about said axis, a control member movably associated with said adjusting member, a cam member associated with said control member and actuated by the movement thereof, a thread-engaging element carried by said adjusting member and axially and rotatably adjustable therewith, said element being shiftable radially of the adjusting member and of the longitudinal axis of the support for operative engagement with the internal thread of the support, said cam member engaging and actuating said element radially into engagement with the thread of said support when the control and cam members are urged in one direction, means for resiliently urging said control and cam members in said direction for cam actuated operative engagement of the element with said thread enabling threaded adjustment of said adjusting member, and manually actuated means to actuate said control member in opposition to said resilient means whereby to disengage said cam member from and release said element from cam urged engagement with said thread to permit sliding adjustment of said adjusting member, said adjusting member being provided with a finger piece, and said manually actuated means being provided with a finger piece so associated with said adjusting member finger piece that a thrusting movement will first actuate the control member to release the thread-engaging element and continued movement will actuate the adjusting member.

4. In a control device of the class described, the combination of an elongated tubular internally threaded support, an adjusting member slidably and rotatably associated with said support for axial sliding movement along the longitudinal axis of the support and rotation about said axis, a control member movably associated with said adjusting member, a cam member associated with said control member and actuated by the movement thereof, a thread-engaging element carried by said adjusting member and axially and rotatably adjustable therewith, said element being shiftable radially of the adjusting member and of the longitudinal axis of the support for operative engagement with the internal thread of the support, said cam member engaging and actuating said element radially into engagement with the thread of said support when the control and cam members are urged in one direction, means for resiliently urging said control and cam members in said direction for cam actuated operative engagement of the element with said thread enabling threaded adjustment of said adjusting member, and manually actuated means to actuate said control member in opposition to said resilient means whereby to disengage said cam member from and release said element from cam urged engagement with said thread to permit sliding adjustment of said adjusting member.

5. In a control device of the class described, the combination of an elongated internally threaded support provided with mounting means, the thread being in the form of a helical groove of curved cross section, a tubular adjusting member slidable and rotatable in said support and having an opening in the side thereof adjacent its inner end, said adjusting member being provided with a handpiece having an outwardly facing recess therein, a spherical thread engaging element disposed in said opening in said adjusting member, a control rod slidable in said adjusting member and having an annular reduced portion permitting the retraction of said thread engaging element and having at the inner end thereof a conical cam acting to project said thread engaging element to thread engaging, actuated position, said control rod being provided with a push button at its outer end disposed in said recess in said handpiece to normally project therefrom, and a spring arranged in said recess in said handpiece and acting on said control rod to urge the cam thereon to a position projecting said thread engaging element radially of the longitudinal axis of the support into actuated thread engaging position.

6. In a control device of the class described, the combination of an elongated internally threaded support provided with mounting means, a tubular adjusting member slidable and rotatable in said support and having an opening in the side thereof adjacent its inner end, said adjusting member being provided with a handpiece having a recess, a thread engaging element disposed in said opening in said adjusting member, a control rod slidable in said adjusting member and having a portion permitting the retraction of said thread engaging element and having a cam acting to project said thread engaging element to thread engaging, actuated position, said control rod being provided with a push button at its outer end disposed in said recess in said handpiece to normally project therefrom, and a spring arranged in said recess in said handpiece and acting on said control rod to urge the cam thereon to a position projecting said thread engaging element radially of the axis of said tubular adjustment member into actuated, thread engaging position.

7. In a control device of the class described, the combination of an internally threaded support provided with mounting means, the thread being in the form of a helical groove of curved cross section, a tubular adjusting member slidable and rotatable in said support and having a side opening, said adjusting member being provided with a handpiece having an outwardly facing recess therein, a spherical thread engaging element disposed in said opening in said adjusting member, and a spring actuated manually releasable control rod slidable in said adjusting member, said rod having an annular reduced portion permitting the retraction of said thread engaging element and having at the inner end thereof a conical cam acting to project said thread engaging element radially outwardly in the side opening of said adjusting member to actuated position, in threading engagement with the internal thread of said support.

8. In a control device of the class described, the combination of an internally threaded support provided with mounting means, a tubular adjusting member slidable and rotatable in said support and having a side opening, said adjusting member being provided with a handpiece, a thread engaging element disposed in said opening in said adjusting member, and a spring actuated manually releasable control rod slidable in said adjusting member, said rod having a portion receiving said thread engaging element radially inwardly of said adjusting member for longitudinal sliding movement of the latter and having a cam acting to project said thread engaging element radially outwardly in the side opening of said adjusting member to actuated position, in threading engagement with the internal thread of said support, said adjusting member being rotatable with said element in said projected position to threadingly advance and retract the adjusting member.

HENRY G. SHAKESPEARE.